UNITED STATES PATENT OFFICE.

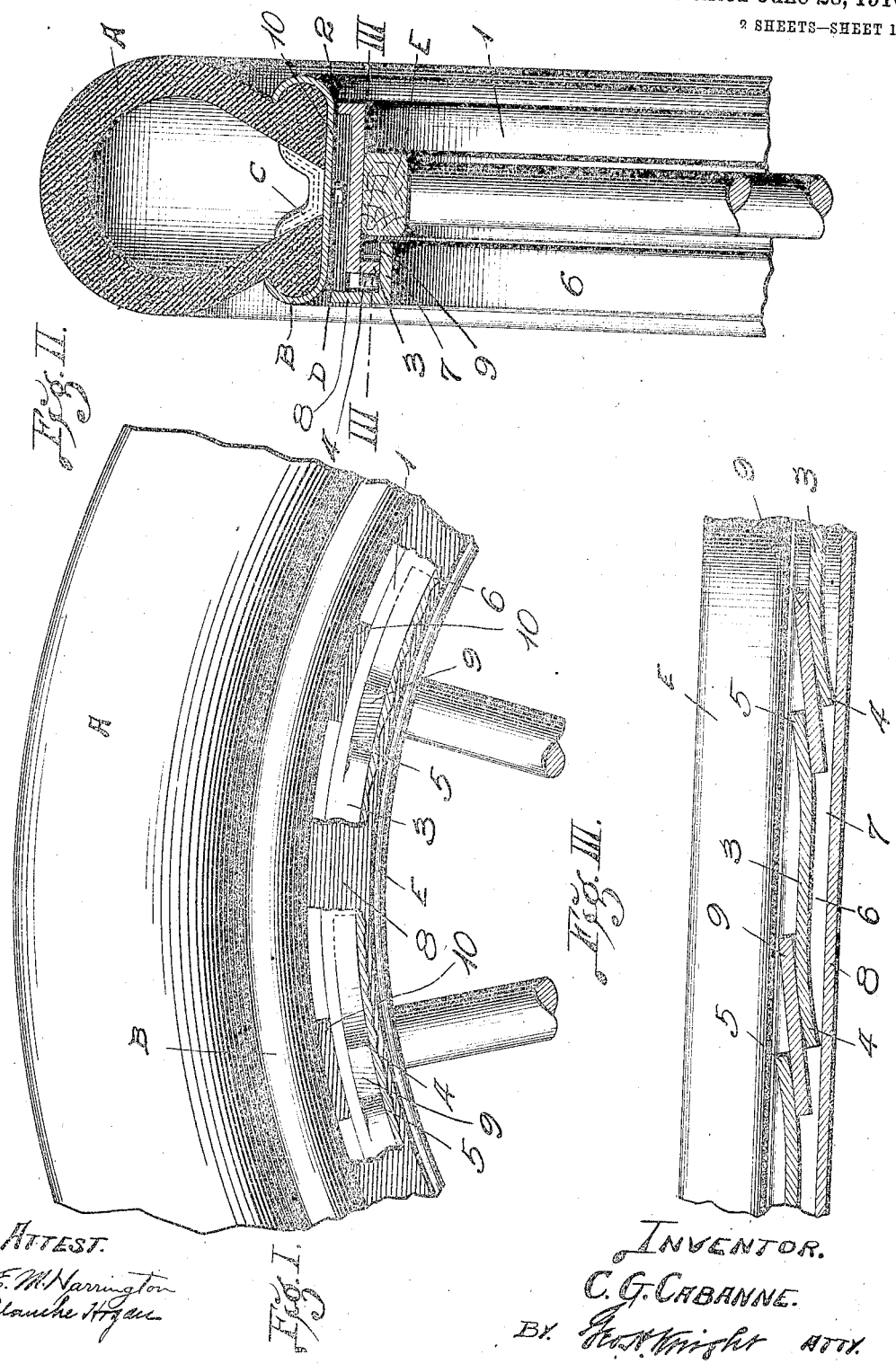

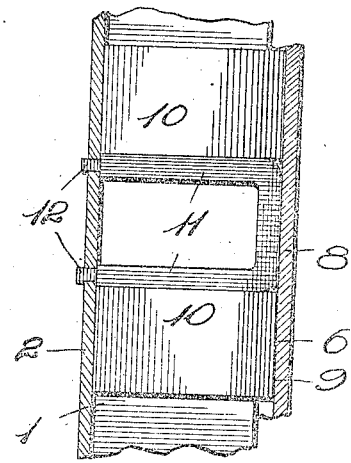
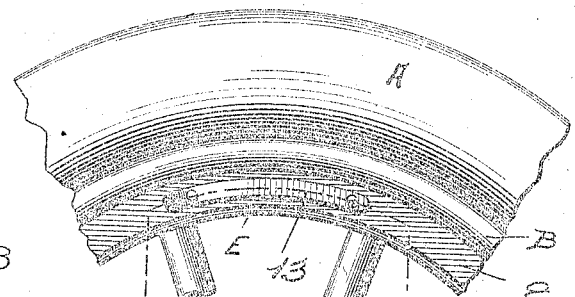
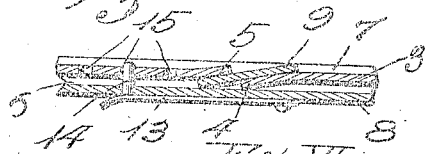
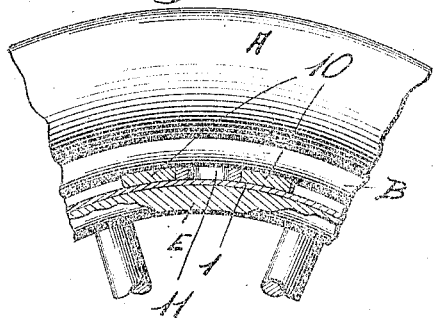
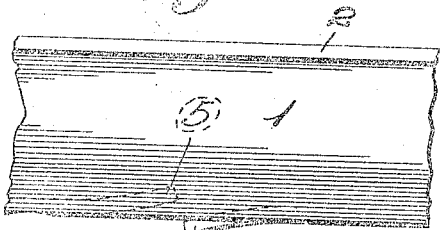
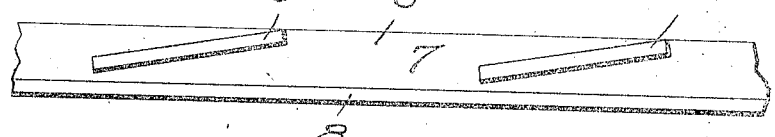

CHARLES G. CABANNE, OF ST. LOUIS, MISSOURI.

MEANS FOR SECURING TIRES TO VEHICLE-WHEELS.

962,814.

Specification of Letters Patent. Patented June 28, 1910.

Application filed September 30, 1908. Serial No. 455,493.

*To all whom it may concern:*

Be it known that I, CHARLES G. CABANNE, a citizen of the United States of America, residing at the city of St. Louis, in the State of Missouri, have invented certain new and useful Improvements in Means for Securing Tires to Vehicle-Wheels, of which the following is a full, clear, and exact description, reference being had to the accompanying drawings, forming part of this specification.

My invention relates to means whereby pneumatic or resilient vehicle wheel tires may be readily and quickly applied to the felly of the wheels, or removed to be replaced by other tires when occasion demands replacement, due to the tires previously in use becoming impaired.

Figure I is a fragmentary view of a vehicle wheel having my improvements incorporated therein, the members shown being illustrated partly in side elevation and partly in section. Fig. II is a cross section through a tire and my tire securing means. Fig. III is a cross section taken on line III—III, Fig. II. Fig. IV is a side elevation of a fragment of a wheel, the view being taken at the location of the latch by which the retaining ring of my tire rim securing means is held from movement relative to the felly carried rim. Fig. V is a section taken on line V—V, Fig. IV. Fig. VI is a fragmentary view of the peripheral face of the felly carried rim. Fig. VII is a fragmentary view of the peripheral face of the tire rim retaining ring. Fig. VIII is a longitudinal section taken through the wheel at the location of the detent by which the tire carrying rim is prevented from creeping relative to the felly carried rim. Fig. IX is in part a side elevation and in part a longitudinal section of a fragment of the wheel at the location of the detent shown in Fig. VIII.

In the accompanying drawings: A designates a resilient vehicle wheel tire and B is a tire receiving rim in which the tire A is fitted, the tire being secured to said rim by any ordinary means, such as spreaders C, see Fig. II, that are provided with threaded shanks which project through the rim B and have nuts D applied to them.

E is the felly of the wheel which may be of any desired form.

1 designates a felly carried rim that surrounds the felly E and is secured thereto by any suitable means. This felly carried rim is provided at one of its sides with an outwardly extending stop flange 2. At the opposite side of the felly carried rim is an inwardly extending flange 3 which projects toward the axis of the wheel. This inwardly extending flange 3 is cut transversely and circumferentially at intervals and the portions of the flange, intermediate of the points at which it is cut, are each bent laterally at one end to produce forwardly projecting inclined tongues 4 and bent laterally at the other end to produce rearwardly projecting inclined tongues 5, as seen most clearly in Figs. III, V and VI. The inclined tongues of the various sections of the flange 3 produced by cutting said flange and bending it as stated, are separated to provide passage-ways between said tongues that lead diagonally through the flange 3.

6 is a retaining ring that is of right-angle shape in cross section, the ring being provided with a laterally rearwardly extending flange 7 and an outwardly extending flange 8. The retaining ring is adapted to be fitted to the felly carried rim 1 at the location of its flange 3 and upon the outer side of the flange 7 of this ring are fins 9 that extend diagonally of said flange, as seen most clearly in Figs. III and VII, and which are of a number corresponding to the number of passageways produced between the tongues 4 and 5 of the flange 3 forming part of the felly carried rim 1. When the retaining ring 6 is applied to the side of the felly carried rim 1 bearing the flange 3 and said ring is rotated relative to the felly carried rim, the fins 9 upon the ring pass rearwardly between the tongues 4 and 5 of the flange 3 of said felly carried rim in a diagonal direction, whereby said ring is placed in interlocked engagement with said flange 3 and it will be apparent that the degree to which the retaining ring is carried toward said flange is dependent only upon the degree of rotation of the ring and the extent of passage of the fins 9 between the tongues 4 and 5.

For the purpose of holding the tire receiving rim B outwardly from the body of the felly carried rim 1, and to prevent lateral movement of said tire receiving rim, I apply to this rim a series of transverse blocks 10 that are adapted to occupy positions between the outwardly extending flange 2 of the felly carried rim 1 and the outwardly extending flange 8 of the tire retaining ring 6. At one point in the wheel these blocks 10 are located in proximity to each other and a key or detent 11, preferably of U-shape, is interposed between said blocks, as seen in Figs. VIII and IX, the key being provided with pins 12 that extend through the outwardly extending flange 2 of the felly carried rim 1. This key serves to hold the tire receiving rim from creeping relative to the felly carried rim.

The retaining ring 6 is held from rotation relative to the felly carried rim after it has been applied to the flange 3 of said rim by a spring latch-arm 13, see Figs. IV and V, that is provided with a pin 14 adapted to enter either of a series of pin-holes 15 in the flange 3 of the felly carried rim when the retaining ring has been adjusted to the desired degree for the purpose of maintaining the tire receiving rim in its proper position around the felly carried rim.

I claim:

1. The combination of a felly carried rim, formed at one side with an outwardly extending flange and at its other side with an inwardly extending flange, having at intervals forwardly and rearwardly extending inclined tongues and diagonal passageways between the inclined tongues, and a retaining ring having an outwardly extending flange and a rearwardly extending flange formed with diagonally arranged peripheral fins adapted to occupy the diagonal passageways of the felly carried rim.

2. The combination of a tire receiving rim, a felly carried rim, formed at one side with an outwardly extending flange and at its other side with an inwardly extending flange, having at intervals forwardly and rearwardly extending inclined tongues, and diagonal passageways between the inclined tongues, a retaining ring having an outwardly extending flange and a rearwardly extending flange formed with diagonally arranged peripheral fins adapted to occupy the diagonal passageways of the felly carried rim, transverse blocks located between the outwardly extending flanges and fixed to the tire receiving rim and a key located between adjacent transverse blocks and in engagement with the felly carried rim.

3. The combination of a felly carried rim, formed at one side with an outwardly extending flange and at its other side with an inwardly extending flange, having at intervals forwardly and rearwardly extending inclined tongues and diagonal passageways between the inclined tongues, a retaining ring having an outwardly extending flange and a rearwardly extending flange formed with diagonally arranged peripheral fins adapted to occupy the diagonal passageways of the felly carried rim, and a spring latch arm, secured to the outwardly extending flange of the ring and having a pin projecting therethrough and through the inwardly extending flange.

4. The combination of a tire receiving rim, a felly carried rim, formed at one side with an outwardly extending flange and at its other side with an inwardly extending flange, having at intervals forwardly and rearwardly extending inclined tongues, and diagonal passageways between the inclined tongues, a retaining ring having an outwardly extending flange and a rearwardly extending flange formed with diagonally arranged peripheral fins adapted to occupy the diagonal passageways of the felly carried rim, transverse blocks located between the outwardly extending flanges and fixed to the tire receiving rim, a key located between adjacent transverse blocks and in engagement with the felly carried rim, and a spring latch arm, secured to the outwardly extending flange of the ring, and having a pin projecting therethrough and through the inwardly extending flange.

CHARLES G. CABANNE.

In presence of—
BLANCHE HOGAN,
HOWARD G. COOK.